United States Patent
Li et al.

(10) Patent No.: US 11,408,512 B2
(45) Date of Patent: Aug. 9, 2022

(54) MAGNETIC FLUID SEALING DEVICE

(71) Applicant: Tsinghua University, Beijing (CN)

(72) Inventors: Decai Li, Beijing (CN); Xiao Liu, Beijing (CN); Zixian Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/563,805

(22) Filed: Dec. 28, 2021

(65) Prior Publication Data

US 2022/0205544 A1 Jun. 30, 2022

(30) Foreign Application Priority Data

Dec. 29, 2020 (CN) .......................... 202011593005.1

(51) Int. Cl.
*F16J 15/43* (2006.01)
(52) U.S. Cl.
CPC ..................................... *F16J 15/43* (2013.01)
(58) Field of Classification Search
CPC ....................................................... F16J 15/43
See application file for complete search history.

(56) References Cited

U.S. PATENT DOCUMENTS

| | | | |
|---|---|---|---|
| 3,620,584 A * | 11/1971 | Rosensweig | F16C 33/765 |
| | | | 384/446 |
| 5,954,342 A | 9/1999 | Mikhalev et al. | |
| 5,975,536 A | 11/1999 | Helgoland | |
| 7,188,840 B2 * | 3/2007 | Li | F16J 15/43 |
| | | | 277/410 |
| 2004/0262846 A1 | 12/2004 | Anzai et al. | |
| 2013/0161910 A1 | 6/2013 | Fukuhara | |
| 2020/0278031 A1 | 9/2020 | Li et al. | |

FOREIGN PATENT DOCUMENTS

| | | |
|---|---|---|
| CN | 1912428 | 2/2007 |
| CN | 103574041 | 2/2014 |
| CN | 207333720 | 5/2018 |

(Continued)

OTHER PUBLICATIONS

CNIPA, First Office Action for CN Application No. 202011593005.1, dated Jun. 28, 2021.

(Continued)

*Primary Examiner* — Vishal A Patel
(74) *Attorney, Agent, or Firm* — Hodgson Russ LLP

(57) ABSTRACT

A magnetic fluid sealing device, includes first pole teeth and a first magnetic fluid adsorbed on the first pole teeth functioning as a first line of defense for sealing, as well as second pole teeth and a second magnetic fluid adsorbed on the second pole teeth functioning as a second line of defense for sealing. The second pole teeth of the magnetic fluid sealing device are arranged on the permanent magnet or the flux sleeve. Since the flux sleeve is fitted over the permanent magnet, the arrangement of the second pole teeth can ensure the ability of the pole shoe to absorb the magnetic fluid, and also can make full use of a length of the permanent magnet in the axial direction of the rotating shaft. Therefore, the magnetic fluid sealing device is effectively improved in the sealing effect and the pressure resistance without increasing its axial length.

10 Claims, 4 Drawing Sheets

(56) References Cited

FOREIGN PATENT DOCUMENTS

| CN | 110939739 | 3/2020 |
|----|-----------|--------|
| CN | 112049937 | 12/2020 |
| JP | S63275858 | 11/1988 |
| JP | H03203067 | 9/1991 |
| JP | H04258576 | 9/1992 |
| JP | H10220595 | 8/1998 |

OTHER PUBLICATIONS

CNIPA, Notification to Grant Patent Right for Invention for GN Application No. 202011593005.1, dated Jul. 29, 2021.

* cited by examiner

MAGNETIC FLUID SEALING DEVICE

CROSS REFERENCE TO RELATED APPLICATION

The present application claims the benefit of, and priority to, Chinese Application No. 202011593005.1, filed on Dec. 29, 2020, the entire disclosure of which is incorporated herein by reference.

FIELD

The present disclosure relates to the field of sealing devices, in particular to a magnetic fluid sealing device.

BACKGROUND

The magnetic fluid sealing device has the advantages of zero leakage, no wear, long life, simple structure, and the like, and is used by more and more industries. The magnetic fluid sealing device in a related technology generally has the problem of poor pressure resistance. The magnetic fluid sealing device described in Publication No. CN106594289A is improved in the pressure resistance by increasing the number of pole teeth. However, this device is only suitable for the case of sufficient axial space, and this method will increase the difficulty in the installation of the magnetic fluid sealing device. Therefore, it is of great significance to effectively improve the pressure resistance of the magnetic fluid sealing device in a limited axial space.

SUMMARY

The present disclosure is intended to solve one of the technical problems in the related technologies to at least some extent. Therefore, embodiments of the present disclosure provide a magnetic fluid sealing device and the magnetic fluid sealing device has excellent sealing performance and good pressure resistance.

A magnetic fluid sealing device according to an embodiment of the present disclosure includes: a shaft housing defining a shaft chamber; a rotating shaft rotatably arranged in the shaft chamber, the rotating shaft extending from one end of the shaft housing into the shaft chamber and going out from the other end of the shaft housing; at least one pole shoe fitted over the rotating shaft, a plurality of first pole teeth arranged along an axial direction of the rotating shaft being formed on an inner circumferential surface of the pole shoe, a first magnetic fluid for sealing being adsorbed on a tooth top surface of each first pole tooth; at least one permanent magnet and at least one flux sleeve, the permanent magnet being fitted over the rotating shaft, the flux sleeve being fitted over the permanent magnet, the flux sleeve abutting against the pole shoe, a plurality of second pole teeth arranged in the axial direction of the rotating shaft being formed on at least one of an inner circumferential surface of the flux sleeve and an outer circumferential surface of the permanent magnet, a second magnetic fluid for sealing being adsorbed on a tooth top surface of each second pole tooth, each of the pole shoe, the permanent magnet and the flux sleeve being located in the shaft chamber.

The additional aspects and advantages of the present disclosure will be set forth in part in the following description and become apparent in part from the following description or be understood through the practice of the present disclosure.

DETAILED DESCRIPTION

Figure 1:
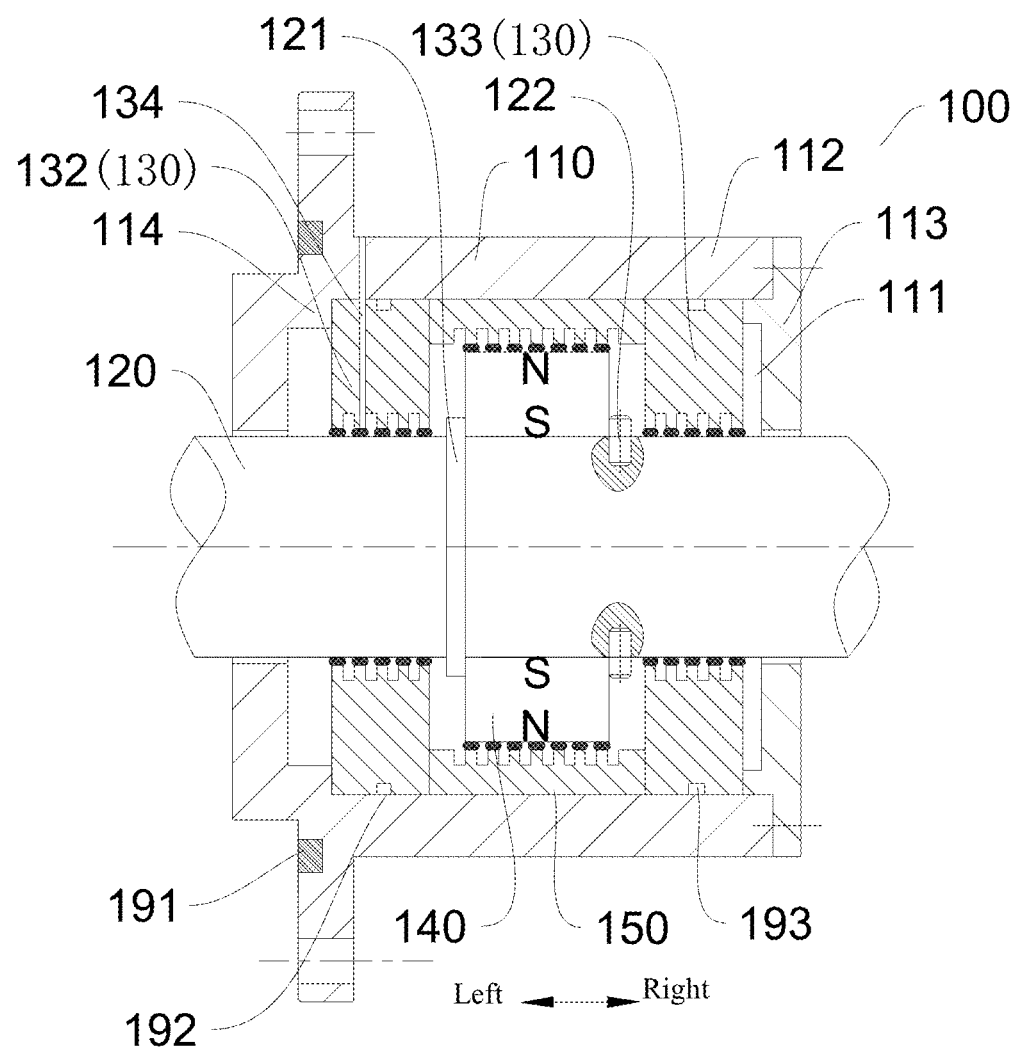
FIG. 1 is a schematic structural diagram of a magnetic fluid sealing device according to a first embodiment of the present disclosure.

Embodiments of the present disclosure are described in detail below, and examples of the embodiments are shown in the accompanying drawings. The embodiments described below with reference to the accompanying drawings are exemplary and are intended to explain the present disclosure. The embodiments shall not be construed as limiting the present disclosure.

A magnetic fluid sealing device 100 according to the embodiments of the present disclosure will be described below according to FIGS. 1 to 6.

The magnetic fluid sealing device 100 includes a shaft housing 110, a rotating shaft 120, at least one pole shoe 130, at least one permanent magnet 140, and at least one flux sleeve 150.

The shaft housing 110 defines a shaft chamber 111. The rotating shaft 120 is rotatably arranged in the shaft chamber 111, and the rotating shaft 120 extends from one end of the shaft housing 110 into the shaft chamber 111 and goes out from the other end of the shaft housing 110. The pole shoe 130 is fitted over the rotating shaft 120. A plurality of first pole teeth 131 arranged along an axial direction of the rotating shaft 120 are formed on an inner circumferential surface of the pole shoe 130, and a first magnetic fluid 1311 for sealing is adsorbed on a tooth top surface of each first pole tooth 131. A first tooth slot 1312 is formed between every two adjacent first pole teeth 131, and the plurality of first pole teeth 131 thus form a plurality of first tooth slots 1312.

The first magnetic fluid 1311 is adsorbed on the tooth top surface of each first pole tooth 131, and the first magnetic fluid 1311 is used for sealing; that is, a gap is formed between the tooth top surface of each first pole tooth 131 and a circumferential surface of the rotating shaft 120, and the first magnetic fluid 1311 is filled in the gap. It can be understood that the first magnetic fluid 1311 is in contact with both the circumferential surface of the rotating shaft 120 and the tooth top surfaces of the first pole teeth 131, so that the magnetic fluid sealing device 100 has a good sealing effect. The first magnetic fluid 1311 can function as a "first line of defense for sealing" of the magnetic fluid sealing device 100.

The permanent magnet 140 is fitted over the rotating shaft 120, and the flux sleeve 150 is fitted over the permanent magnet 140 and abuts against the pole shoe 130. The flux sleeve 150 has a magnetic permeability function. The flux sleeve 150 is fitted over the permanent magnet 140 so as to transmit the magnetic force of the permanent magnet 140, and the flux sleeve 150 abuts against the pole shoe 130 to provide the magnetic force of the permanent magnet 140 to the pole shoe 130 so that the first pole teeth 131 on the pole shoe 130 can adsorb the first magnetic fluid 1311. The flux sleeve 150 and the permanent magnet 140 are arranged in the axial direction of the rotating shaft 120.

A plurality of second pole teeth 171 arranged in the axial direction of the rotating shaft 120 are formed on at least one of an inner circumferential surface of the flux sleeve 150 and an outer circumferential surface of the permanent magnet 140, a second magnetic fluid 1711 for sealing is adsorbed on a tooth top surface of each second pole tooth 171, and a second tooth slot is formed between every two adjacent second pole teeth 171. In other words, in addition to the first magnetic fluid 1311 adsorbed on the first pole teeth 131 for sealing, the second magnetic fluid 1711 adsorbed on the second pole teeth 171 can also play a sealing role.

For example, a plurality of second pole teeth 171 are formed on the inner circumferential surface of the flux sleeve 150, a gap is formed between the tooth top surface of each second pole tooth 171 and the outer circumferential surface of the permanent magnet 140, the second magnetic fluid 1711 is filled in the gap, and the second magnetic fluid 1711 is in contact with both the outer circumferential surface of the permanent magnet 140 and the tooth top surfaces of the second pole teeth 171, thereby adding a "second line of defense for sealing" to the magnetic fluid sealing device 100 and further improving the sealing effect of the magnetic fluid sealing device 100.

Each of the pole shoe 130, the permanent magnet 140 and the flux sleeve 150 is located in the shaft chamber 111.

The magnetic fluid sealing device 100 according to the embodiment of the present disclosure includes the first pole teeth 131 and the first magnetic fluid 1311 adsorbed on the first pole teeth 131 functioning as the first line of defense for sealing, as well as the second pole teeth 171 and the second magnetic fluid 1711 adsorbed on the second pole teeth 171 functioning as the second line of defense for sealing. The second pole teeth 171 of the magnetic fluid sealing device 100 are arranged on the permanent magnet 140 or the flux sleeve 150. Since the flux sleeve 150 is fitted over the permanent magnet 140, the arrangement of the second pole teeth 171 can ensure the ability of the pole shoe to absorb the magnetic fluid, and at the same time can make full use of a length of the permanent magnet 140 in the axial direction of the rotating shaft 120. Therefore, the sealing effect of the magnetic fluid sealing device 100 can be effectively improved and the pressure resistance of the magnetic fluid sealing device 100 can be enhanced, without increasing an axial length of the magnetic fluid sealing device 100.

Therefore, the magnetic fluid sealing device 100 of the embodiment of the present disclosure has the advantages of excellent sealing performance and good pressure resistance.

The magnetic fluid sealing device 100 further includes a sealed cavity, and the shaft housing 110 is connected with the sealed cavity (not shown in the figures). The sealed cavity is configured to contain a sealing medium, and the magnetic fluid sealing device 100 can effectively seal the sealing medium to prevent leakage of the sealing medium.

Optionally, a size of the gap between the tooth top surface of each first pole tooth 131 and the circumferential surface of the rotating shaft 120 is between 0.1 mm and 0.3 mm.

For easier understanding of the technical solution of the present disclosure, an example where the axial direction of the rotating shaft 120 is considered as a left-right direction is provided below to further describe the technical solution of the present disclosure. One end of the shaft housing 110 is its right end, and the other end of the shaft housing 110 is its left end. The sealed cavity is located on a left side of the shaft housing 110 and is connected to the left end of the shaft housing 110.

First Embodiment

As shown in FIG. 1, the magnetic fluid sealing device 100 includes two pole shoes 130 (i.e., a first pole shoe 132 and a second pole shoe 133), and further includes one permanent magnet 140 and one flux sleeve 150, and the permanent magnet 140 and the flux sleeve 150 are located between the first pole shoe 132 and the second pole shoe 133 in the axial direction of the rotating shaft 120.

The permanent magnet 140 has a first end (left end) and a second end (right end) opposite to each other in the axial direction of the rotating shaft 120. The first end of the permanent magnet 140 is closer to the first pole shoe 132 than the second end of the permanent magnet 140, a space is formed between the first end of the permanent magnet 140 and the first pole shoe 132, and a space is formed between the second end of the permanent magnet 140 and the second pole shoe 133. In other words, the first end of the permanent magnet 140 and the first pole shoe 132 are opposite to each other in the axial direction of the rotating shaft 120 and spaced apart from each other. The second end of the permanent magnet 140 and the second pole shoe 133 are opposite to each other in the axial direction of the rotating shaft 120 and spaced apart from each other. Optionally, the permanent magnet 140 is made of one of iron-boron, shirt-drill, and iron-drilled nickel.

The flux sleeve 150 has a first end (left end) and a second end (right end) opposite to each other in the axial direction of the rotating shaft 120. The first end of the flux sleeve 150 abuts against the first pole shoe 132, and the second end of the flux sleeve 150 abuts against the second pole shoe 133. In other words, the flux sleeve 150 abuts against both the first pole shoe 132 and the second pole shoe 133. The magnetic force of the permanent magnet 140 is transferred to the first pole shoe 132 and the second pole shoe 133 through the flux sleeve 150 so that the first pole shoe 132 and the second pole shoe 133 can adsorb the first magnetic fluid 1311.

Optionally, the permanent magnet 140 is magnetized by radiation. The permanent magnet 140 is magnetized by radiation, which means that the inner and outer circumferential surfaces of the permanent magnet 140 are different in magnetism. As shown in FIG. 1, the outer circumferential surface of the permanent magnet 140 is an N pole, and the inner circumferential surface of the permanent magnet 140 is an S pole.

Figure 2:
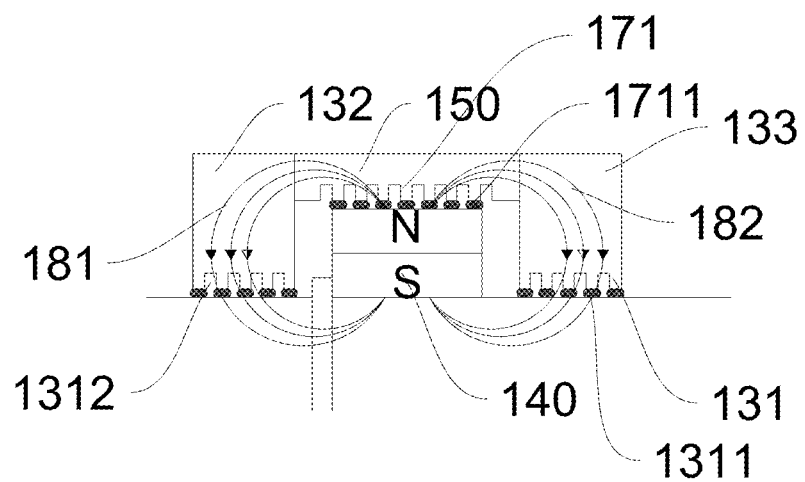
FIG. 2 is an enlarged schematic diagram of a part in FIG. 1.

FIG. 2 shows two magnetic loops formed by the permanent magnet 140 through the flux sleeve 150, the two pole shoes 130, and the rotating shaft 120. The permanent magnet 140, the flux sleeve 150, the first pole shoe 132 and the rotating shaft 120 form a first magnetic loop 181. The permanent magnet 140, the flux sleeve 150, the second pole shoe 133 and the rotating shaft 120 form a second magnetic loop 182.

It can be understood that the flux sleeve 150 and the permanent magnet 140 are opposite to each other in a radial direction of the rotating shaft 120. In addition, a length of the flux sleeve 150 in the axial direction of the rotating shaft 120 is greater than the length of the permanent magnet 140 in the axial direction of the rotating shaft 120.

In the embodiment shown in FIG. 1, the flux sleeve 150 has second pole teeth 171 formed on the inner circumferential surface of a portion opposite to the permanent magnet 140 in the radial direction of the rotating shaft 120. A gap is formed between a tooth top surface of each second pole tooth 171 and the outer circumferential surface of the permanent magnet 140, and the second magnetic fluid 1711 is located in the gap.

In other words, second pole teeth 171 are formed on the inner circumferential surface of the flux sleeve 150 opposite to the outer circumferential surface of the permanent magnet 140 in the radial direction of the rotating shaft 120; a second magnetic fluid 1711 for sealing the gap between the flux sleeve 150 and the permanent magnet 140 is adsorbed on the second pole teeth 171; the second magnetic fluid 1711 is in contact with both the outer circumferential surface of the permanent magnet 140 and the tooth top surfaces of the second pole teeth 171.

Optionally, the size of the gap between the tooth top surface of each second pole tooth 171 and the outer circumferential surface of the permanent magnet 140 is between 0.1 mm and 0.3 mm.

Compared with a magnetic fluid sealing device 100 in a related art that only includes the pole shoe 130 provided with the first pole teeth 131, the magnetic fluid sealing device 100 in this embodiment further has the second pole teeth 171, thus achieving better sealing performance. In addition, compared with a magnetic fluid sealing device 100 in the related art that includes pole shoes 130 having the same number of pole teeth (i.e., the sum of the number of pole teeth of the first pole teeth 131 and the second pole teeth 171), the magnetic fluid sealing device 100 in this embodiment further has a smaller length in the axial direction of the rotating shaft 120. As a result, excellent sealing performance is ensured, and the technical solution of this embodiment is more conducive to the miniaturization of the magnetic fluid sealing device 100.

Further, as shown in FIG. 1, each of the first pole shoe 132, the second pole shoe 133 and the flux sleeve 150 is connected to a circumferential wall surface of the shaft chamber 111, and the permanent magnet 140 is connected to the rotating shaft 120. In other words, the first pole shoe 132, the second pole shoe 133, and the flux sleeve 150 are relatively fixed to the shaft housing 110. The permanent magnet 140 is relatively fixed to the rotating shaft 120 and can rotate together with the rotating shaft 120. Optionally, the permanent magnet 140 and the rotating shaft 120 are in interference fit.

Further, as shown in FIG. 1, a shaft shoulder 121 is formed on the rotating shaft 120, and the rotating shaft 120 is further provided with a limit pin 122. The permanent magnet 140 is located between the shaft shoulder 121 and the limit pin 122 in the axial direction of the rotating shaft 120 and abuts against both the shaft shoulder 121 and the limit pin 122. The shaft shoulder 121 and the limit pin 122 are configured to prevent the permanent magnet 140 from axially moving. As an example, the circumferential surface of the rotating shaft 120 is provided with limit holes. A part of the limit pin 122 is fitted in the limit hole, and the other part of the limit pin 122 protrudes from the limit hole and abuts against the permanent magnet 140.

As shown in FIG. 1, the shaft shoulder 121 is located on the left side of the permanent magnet 140 and abuts against the first end of the permanent magnet 140. The shaft shoulder 121 is located between the first pole shoe 132 and the permanent magnet 140 in the axial direction of the rotating shaft 120. In addition, a space is formed between the shaft shoulder 121 and the first pole shoe 132. The limit pin 122 is located on the right side of the permanent magnet 140 and abuts against the second end of the permanent magnet 140. The limit pin 122 is located between the second pole shoe 133 and the permanent magnet 140 in the axial direction of the rotating shaft 120, and a space is formed between the limit pin 122 and the second pole shoe 133.

Optionally, a plurality of limit pins 122 are provided. The plurality of limit pins 122 are arranged around the rotating shaft 120 and spaced apart. Optionally, three limit pins 122 are provided.

The structure of the magnetic fluid sealing device 100 in this embodiment will be described in detail below by taking FIG. 1 as an example.

As shown in FIG. 1, the sealed cavity is located on the left side of the shaft housing 110, and the first pole shoe 132 is closer to the sealed cavity than the second pole shoe 133. In other words, the first pole shoe 132, the flux sleeve 150 and the second pole shoe 133 are arranged in sequence from left to right and abut against each other in sequence. The shaft housing 110 includes a body 112 and an end cover 113. The body 112 has an opening in the right side. The opening is formed to install various components in the shaft housing 110. The end cover 113 is arranged at the opening and connected with the body 112. The body 112 and the end cover 113 are mated to form a shaft chamber 111, and the first pole shoe 132, the second pole shoe 133, the flux sleeve 150 and the permanent magnet 140 are all arranged in the shaft chamber 111. A protrusion 114 is formed on an inner circumferential surface of the body 112. A left end surface of the first pole shoe 132 abuts against the protrusion 114, and a right end surface of the second pole shoe 133 abuts against an inner side of the end cover 113.

A first sealing ring 191 is arranged at a joint between the shaft housing 110 and the sealed cavity, and the first sealing ring 191 is configured to seal the joint between the shaft housing 110 and the sealed cavity. The magnetic fluid sealing device 100 further includes a second sealing ring 192 and a third sealing ring 193. The second sealing ring 192 is located between an outer circumferential surface of the first pole shoe 132 and the circumferential wall surface of the shaft chamber 111, and the third sealing ring 193 is located between an outer circumferential surface of the second pole shoe 133 and the circumferential wall surface of the shaft chamber 111. The second sealing ring 192 and the third sealing ring 193 are configured to improve the sealing performance between the outer circumferential surfaces of the first pole shoe 132 and the second pole shoe 133 and the circumferential wall surface of the shaft chamber 111.

Optionally, the first sealing ring 191, the second sealing ring 192, or the third sealing ring 1931 may be one of an O-shaped sealing ring, a V-shaped sealing ring, and a U-shaped sealing ring.

The first pole shoe 132 is provided with a magnetic fluid injection hole 134 for injecting the first magnetic fluid 1311 into the first pole teeth 131 of the first pole shoe 132. The body 112 is provided with a through hole opposite to the magnetic fluid injection hole 134.

During assembly of the magnetic fluid sealing device 100 in this embodiment, the first pole shoe 132 is mounted in the shaft housing 110, the rotating shaft 120 with the permanent magnet 140 is then inserted in the first pole shoe 132, the flux sleeve 150 is then mounted in place, and the second magnetic fluid 1711 is injected into the second pole teeth 171 of the flux sleeve 150. Next, the second pole shoe 133 is mounted in place, the first magnetic fluid 1311 is then injected into the first pole teeth 131 of the second pole shoe 133, and the end cover 113 is then mounted in place. Finally, the first magnetic fluid 1311 is injected into the first pole teeth 131 of the first pole shoe 132 through the magnetic fluid injection hole 134.

Second Embodiment

Figure 3:
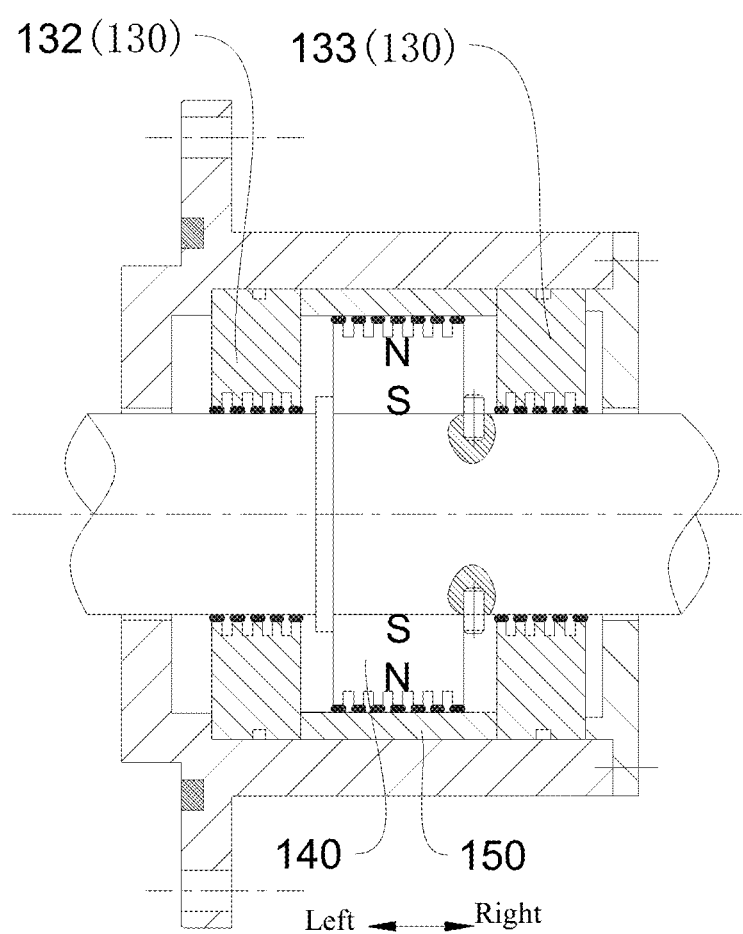
FIG. 3 is a schematic structural diagram of a magnetic fluid sealing device according to a second embodiment of the present disclosure.

The structure of the magnetic fluid sealing device 100 in this embodiment is shown in FIG. 3. The difference from the first embodiment is that, in this embodiment, second pole teeth 171 are formed on the outer circumferential surface of the permanent magnet 140, a gap is formed between the tooth top surface of each second pole tooth 171 and the inner circumferential surface of the flux sleeve 150, and the second magnetic fluid 1711 is located in the gap. The second magnetic fluid 1711 is in contact with both the inner circumferential surface of the flux sleeve 150 and the tooth top surfaces of the second pole teeth 171.

Optionally, the size of the gap between the tooth top surface of each second pole tooth 171 and the inner circumferential surface of the flux sleeve 150 is between 0.1 mm and 0.3 mm.

The magnetic fluid sealing device 100 in this embodiment has a better sealing effect without increasing the size of the magnetic fluid sealing device 100 in the axial direction.

Third Embodiment

Figure 4:
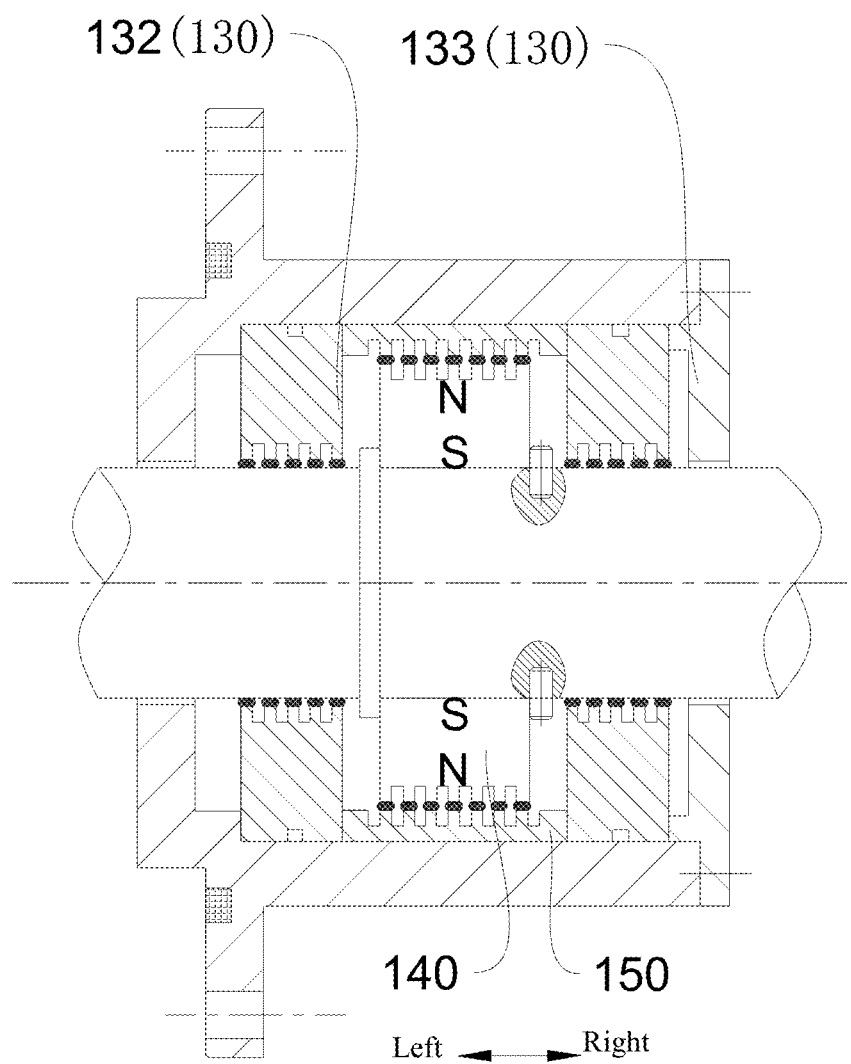
FIG. 4 is a schematic structural diagram of a magnetic fluid sealing device according to a third embodiment of the present disclosure.

The structure of the magnetic fluid sealing device 100 in this embodiment is shown in FIG. 4, and the structure of the magnetic fluid sealing device 100 in this embodiment is similar to that of the first embodiment, except that: the second pole teeth 171 are formed on both the outer circumferential surface of the permanent magnet 140 and the inner circumferential surface of the portion of the flux sleeve 150 opposite to the permanent magnet 140 in the radial direction of the rotating shaft 120, the second pole teeth 171 on the permanent magnet 140 and the second pole teeth 171 on the flux sleeve 150 are opposite in one-to-one correspondence in the radial direction of the rotating shaft 120 and have gaps therebetween, and the second magnetic fluid 1711 is located in the gaps. the expression "the second pole teeth 171 on the permanent magnet 140 and the second pole teeth 171 of the flux sleeve 150 are opposite in one-to-one correspondence in the radial direction of the rotating shaft 120" means that the number of the second pole teeth 171 on the permanent magnet 140 is equal to that of the flux sleeve 150 and each second pole tooth 171 on the permanent magnet 140 is opposite to one of the second pole teeth 171 on the flux sleeve 150 in the radial direction of the rotating shaft 120.

Optionally, the gap between the tooth top surface of each second pole tooth 171 of the permanent magnet 140 and the tooth top surface of the corresponding second pole tooth 171 of the flux sleeve 150 in the radial direction of the rotating shaft 120 is between 0.1 mm and 0.3 mm.

The second magnetic fluid 1711 is filled between the second pole teeth 171 on the permanent magnet 140 and the second pole teeth 171 on the flux sleeve 150, and the second magnetic fluid 1711 is in contact with both the tooth top surfaces of the second pole teeth 171 on the permanent magnet 140 and the tooth top surfaces of the second pole teeth 171 on the flux sleeve 150. Due to this arrangement, a magnetic field between the second pole teeth 171 on the permanent magnet 140 and the second pole teeth 171 on the flux sleeve 150 is stronger, the ability to adsorb the second magnetic fluid 1711 is stronger, and the second magnetic fluid 1711 is more firmly adsorbed. Thus, the sealing effect of the magnetic fluid sealing device 100 achieves better sealing effect and stronger pressure resistance.

Fourth Embodiment

Figure 5:
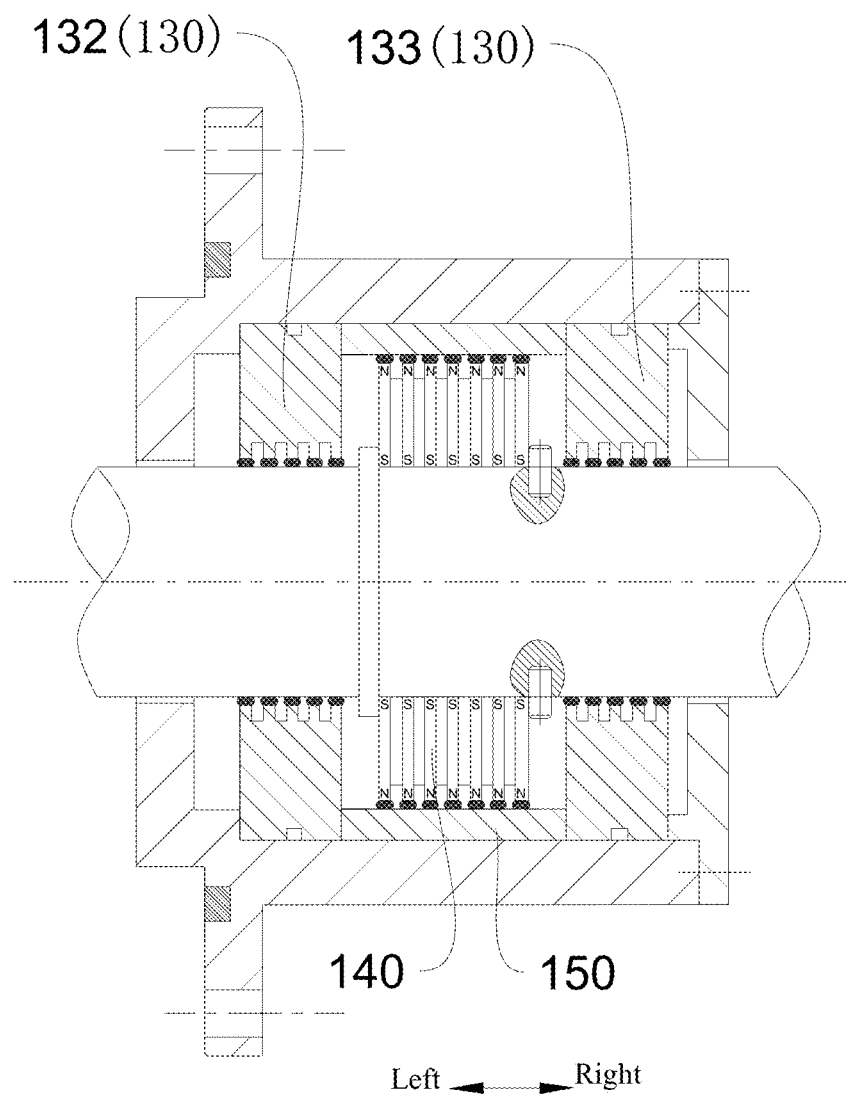
FIG. 5 is a schematic structural diagram of a magnetic fluid sealing device according to a fourth embodiment of the present disclosure.
Figure 6:
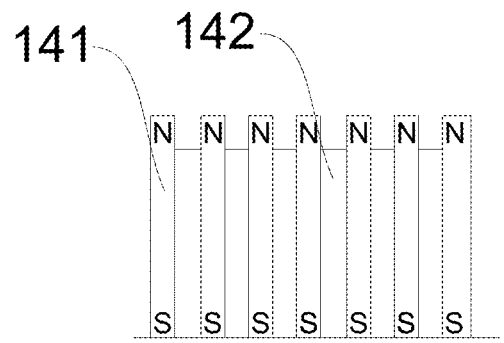
FIG. 6 is a schematic structural diagram of a permanent magnet according to the fourth embodiment of the present disclosure.

As shown in FIGS. 5 and 6, the structure of the magnetic fluid sealing device 100 in this embodiment is similar to that of the first embodiment, except that the permanent magnet 140 includes a plurality of permanent magnet sheets 141 and a plurality of non-magnetic conductive sheets 142 arranged along the axial direction of the rotating shaft 120, the permanent magnet sheets 141 and the non-magnetic conductive sheets 142 are alternately arranged, outer circumferential surfaces of the plurality of permanent magnet sheets 141 are flush, outer circumferential surfaces of the plurality of non-magnetic conductive sheets 142 are flush, and the outer circumferential surfaces of the permanent magnet sheets 141 are located at outer sides of the outer circumferential surfaces of the non-magnetic conductive sheets 142 so as to form a plurality of second pole teeth 171.

The expression "the outer circumferential surfaces of the permanent magnet sheets 141 are located at outer sides of the outer circumferential surfaces of the non-magnetic conductive sheets 142" means that relative to the outer circumferential surfaces of the non-magnetic conductive sheets 142, the outer circumferential surfaces of the permanent magnet sheets 141 are farther away from the rotating shaft 120. In other words, the part of the permanent magnet sheet 141 protruding from the non-magnetic conductive sheet 142 forms the second pole tooth 171, and the second pole tooth 171 has magnetism.

As shown in FIG. 6, the permanent magnet sheet 141 is magnetized by radiation, that is, the magnetism of the outer circumferential surface of the permanent magnet sheet 141 is different from that of the inner circumferential surface of the permanent magnet sheet 141.

In the description of the present invention, it is to be understood that the orientations or positional relationships, indicated by the terms "central", "longitudinal", "lateral", "length", "width", "thickness", "on", "under", "front", "rear", "left", "right", "vertical", "horizontal", "top", "bottom", "inside", "outside", "clockwise", "counterclockwise", "axial", "radial", "circumferential", and the like, are based on the orientations or positional relationships shown in the drawings and are only for the purpose of facilitating and simplifying the description of the present invention, rather than indicating or implying that the described device or element must have a particular orientation or must be constructed and operated in a particular orientation, and therefore they cannot to be construed as limiting the present invention.

Moreover, the terms "first" and "second" are used for descriptive purposes only and are not to be construed as indicating or implying a relative importance or implicitly indicating the number of technical features indicated. Thus, features defined by the term "first" or "second" may include at least one of the features, either explicitly or implicitly. In the description of the present invention, the meaning of "a plurality of" is at least two, such as two, three, etc., unless specifically defined otherwise.

In the present invention, unless explicitly stated and defined otherwise, the terms "mounted", "connected with", "connected", "fixed" and the like shall be understood broadly; for example, it may be either a fixed connection or a detachable connection, or in one piece; it may be a mechanical connection, or it may be an electrical connection or a mutual communication; it may be a direct connection or indirect connection through an intermediate medium, and may be an internal communication of two components or an interaction relationship between two components, unless otherwise expressly defined. For those skilled in the art, the specific meanings of the above terms in the present disclosure could be understood according to the specific conditions.

In the present disclosure, the first feature being "on" or "under" the second feature may mean that the first feature and the second feature are in a direct contact, or the first and second features may be in an indirect contract through an intermediate medium, unless otherwise explicitly stated and defined. Moreover, the first feature being "at the top of", "above" and "on" the second feature may mean that the first feature is right above or above and to one side of the second feature, or may merely mean that the first feature is horizontally higher than the second feature. The first feature being "at the bottom of", "below" and "under" the second feature may mean that the first feature is below or below and to one side of the second feature, or may merely mean that the first feature is horizontally lower than the second feature.

In the present disclosure, the description with reference to the terms "one embodiment", "some embodiments", "example", "specific example", or "some examples" and the like means specific features, structures, materials or characteristics described in connection with the embodiment or example are included in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, those skilled in the art can integrate and combine various embodiments or examples described in the present specification, as well as features of various embodiments or examples, without contradicting each other.

Although the embodiments of the present disclosure have been shown and described, it would be understood that the above-described embodiments are illustrative and are not to be construed as limiting the scope of the present disclosure. Changes, modifications, substitutions and variations of the above-described embodiments may be made by those skilled in the art within the scope of the present disclosure.

What is claimed is:

1. A magnetic fluid sealing device, comprising:
   a shaft housing defining a shaft chamber;
   a rotating shaft rotatably arranged in the shaft chamber, the rotating shaft extending from one end of the shaft housing into the shaft chamber and going out from the other end of the shaft housing;
   a first pole shoe and a second pole shoe fitted over the rotating shaft, a plurality of first pole teeth arranged along an axial direction of the rotating shaft being formed on an inner circumferential surface of the first pole shoe and an inner circumferential surface of the second pole shoe, a first magnetic fluid for sealing being adsorbed on a tooth top surface of each of the plurality of first pole teeth; and
   a permanent magnet and a flux sleeve, the permanent magnet being fitted over the rotating shaft, the flux sleeve being fitted over the permanent magnet, the flux sleeve abutting against the first pole shoe and the second pole shoe, a plurality of second pole teeth arranged in the axial direction of the rotating shaft being formed on at least one of an inner circumferential surface of the flux sleeve and an outer circumferential surface of the permanent magnet, a second magnetic fluid for sealing being adsorbed on a tooth top surface of each of the plurality of second pole teeth, each of the first pole shoe, second pole shoe, the permanent magnet, and the flux sleeve being located in the shaft chamber,
   wherein the permanent magnet and the flux sleeve are located between the first pole shoe and the second pole shoe in the axial direction of the rotating shaft, the permanent magnet has a first end and a second end opposite to each other in the axial direction of the rotating shaft, the first end of the permanent magnet is closer to the first pole shoe than the second end of the permanent magnet, a space is formed between the first end of the permanent magnet and the first pole shoe in the axial direction of the rotating shaft, and a space is formed between the second end of the permanent magnet and the second pole shoe in the axial direction of the rotating shaft.

2. The magnetic fluid sealing device according to claim 1, wherein the flux sleeve has a first end and a second end opposite to each other in the axial direction of the rotating shaft, the first end of the flux sleeve abuts against the first pole shoe, and the second end of the flux sleeve abuts against the second pole shoe.

3. The magnetic fluid sealing device according to claim 2, wherein the second pole teeth are formed on the inner circumferential surface of a portion of the flux sleeve opposite to the permanent magnet in a radial direction of the rotating shaft, a gap is formed between the tooth top surface of the second pole tooth and the outer circumferential surface of the permanent magnet, and the second magnetic fluid is located in the gap.

4. The magnetic fluid sealing device according to claim 2, wherein the second pole teeth are formed on the outer circumferential surface of the permanent magnet, a gap is formed between the tooth top surface of the second pole tooth and the inner circumferential surface of the flux sleeve, and the second magnetic fluid is located in the gap.

5. The magnetic fluid sealing device according to claim 2, wherein the second pole teeth are formed on both the outer circumferential surface of the permanent magnet and the inner circumferential surface of a portion of the flux sleeve opposite to the permanent magnet in the radial direction of the rotating shaft, the second pole teeth on the permanent magnet and the second pole teeth on the flux sleeve are opposite in one-to-one correspondence in the radial direction of the rotating shaft and have gaps therebetween, and the second magnetic fluid is located in the gaps.

6. The magnetic fluid sealing device according to claim 1, wherein the permanent magnet is magnetized by radiation.

7. The magnetic fluid sealing device according to claim 4, wherein the permanent magnet comprises a plurality of permanent magnet sheets and a plurality of non-magnetic conductive sheets arranged along the axial direction of the rotating shaft, the permanent magnet sheets and the non-magnetic conductive sheets are alternately arranged, outer circumferential surfaces of the plurality of permanent magnet sheets are flush, outer circumferential surfaces of the plurality of non-magnetic conductive sheets are flush, the outer circumferential surfaces of the permanent magnet sheets are located at outer sides of the outer circumferential surfaces of the non-magnetic conductive sheets so as to form the plurality of second pole teeth, and the permanent magnet sheets are magnetized by radiation.

8. The magnetic fluid sealing device according to claim 5, wherein the permanent magnet comprises a plurality of permanent magnet sheets and a plurality of non-magnetic conductive sheets arranged along the axial direction of the rotating shaft, the permanent magnet sheets and the non-magnetic conductive sheets are alternately arranged, outer circumferential surfaces of the plurality of permanent magnet sheets are flush, outer circumferential surfaces of the plurality of non-magnetic conductive sheets are flush, the outer circumferential surfaces of the permanent magnet sheets are located at outer sides of the outer circumferential surfaces of the non-magnetic conductive sheets so as to form the plurality of second pole teeth, and the permanent magnet sheets are magnetized by radiation.

9. The magnetic fluid sealing device according to claim 1, wherein each of the first pole shoe, the second pole shoe, and the flux sleeve is connected to a circumferential wall surface of the shaft chamber, and the permanent magnet is connected to the rotating shaft.

10. The magnetic fluid sealing device according to claim 9, wherein a shaft shoulder is formed on the rotating shaft, the rotating shaft is further provided with a limit pin, the permanent magnet is located between the shaft shoulder and the limit pin in the axial direction of the rotating shaft and abuts against both the shaft shoulder and the limit pin.

* * * * *